(12) United States Patent
Nord et al.

(10) Patent No.: US 12,022,430 B2
(45) Date of Patent: Jun. 25, 2024

(54) PAGING AND MULTI-IDENTITY MODULE WIRELESS COMMUNICATION DEVICES

(71) Applicant: Sony Group Corporation, Tokyo (JP)

(72) Inventors: Lars Nord, Lund (SE); Anders Mellqvist, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 357 days.

(21) Appl. No.: 17/439,356

(22) PCT Filed: Mar. 26, 2020

(86) PCT No.: PCT/EP2020/058568
§ 371 (c)(1),
(2) Date: Sep. 14, 2021

(87) PCT Pub. No.: WO2020/193707
PCT Pub. Date: Oct. 1, 2020

(65) Prior Publication Data
US 2022/0201648 A1   Jun. 23, 2022

(30) Foreign Application Priority Data
Mar. 28, 2019   (SE) .................................. 1930097-9

(51) Int. Cl.
*H04W 68/02*   (2009.01)
*H04W 8/18*   (2009.01)
(Continued)

(52) U.S. Cl.
CPC ........... *H04W 68/02* (2013.01); *H04W 8/183* (2013.01); *H04W 8/26* (2013.01); *H04W 88/06* (2013.01)

(58) Field of Classification Search
None
See application file for complete search history.

(56) References Cited

U.S. PATENT DOCUMENTS

| | | |
|---|---|---|
| 2012/0027003 A1 | 2/2012 | Chin |
| 2013/0165182 A1 | 6/2013 | Christensen |

(Continued)

FOREIGN PATENT DOCUMENTS

| | | |
|---|---|---|
| CN | 101800975 A | 8/2010 |
| CN | 102282898 A | 12/2011 |

(Continued)

OTHER PUBLICATIONS

International Search Report and Written Opinion from corresponding International Application No. PCT/EP2020/058568, May 26, 2020, 15 pages.

(Continued)

*Primary Examiner* — Frantz Bataille
(74) *Attorney, Agent, or Firm* — Tucker Ellis LLP

(57) ABSTRACT

A method of operating a wireless communication device (101) capable of connecting to at least one communication network (100, 100-1, 100-2, 115, 115-1, 115-2) using multiple identities (451, 452) is provided. The method includes connecting to the at least one communication network (100, 100-1, 100-2, 115, 115-1, 115-2) using a first identity (451); and connecting to the at least one communication network (100, 100-1, 100-2, 115, 115-1, 115-2) using a second (Continued)

identity (452); and transmitting a request (901, 902, 903) to co-schedule paging occasions (401-403) associated with the first identity (451) and with the second identity (452).

19 Claims, 10 Drawing Sheets

(51) Int. Cl.
 *H04W 8/26* (2009.01)
 *H04W 88/06* (2009.01)

(56) References Cited

U.S. PATENT DOCUMENTS

| | | |
|---|---|---|
| 2013/0260756 A1 | 10/2013 | Huang |
| 2013/0294417 A1 | 11/2013 | Yerrabommanahalli |
| 2014/0038671 A1* | 2/2014 | Christensen ......... H04B 1/3816 455/558 |
| 2014/0128082 A1* | 5/2014 | Chirayil ................ H04W 68/02 455/438 |
| 2014/0274047 A1 | 9/2014 | Dhanda |
| 2017/0359772 A1 | 12/2017 | Lee |
| 2019/0037531 A1 | 1/2019 | Pantus |
| 2019/0159168 A1 | 5/2019 | Wang |
| 2020/0205122 A1 | 6/2020 | Liu |

FOREIGN PATENT DOCUMENTS

| | | |
|---|---|---|
| CN | 108419290 A | 8/2018 |
| EP | 2472973 A1 | 7/2012 |
| EP | 3344000 A1 | 7/2018 |
| JP | 2012517781 A | 8/2012 |
| WO | 2018004541 A1 | 1/2018 |
| WO | WO-2018019882 A1 | 2/2018 |
| WO | WO-2019041152 A1 | 3/2019 |

OTHER PUBLICATIONS

Sony, "Solution KI#2: Ue suggested UE_ID for paging," 3GPP SA WG2 Meeting #136, S2-1911143, Nov. 18-22, 2019, 6 pages.

CATT, TP for 38.413 Correction to Paging, 3GPP Tsg Ran WG3 adhoc_R3-AH-1807 R3-184353, 3GPP, Jul. 10, 2018.

Intel, Verizon, AT&T, Sony, Samsung, Charter Communications, China Mobile, Lenovo, Motorola Mobility, NEC, vivo, Oppo, Kpn, Etri, InterDigital, New SID: Study on system enablers for multi-SIM devices, 3GPP TSG SA WG2#129BIS S2-1813346, 3GPP, Nov. 30, 2018.

* cited by examiner

PAGING AND MULTI-IDENTITY MODULE WIRELESS COMMUNICATION DEVICES

TECHNICAL FIELD

Various examples generally relate to paging a wireless communication device that is capable of connecting to at least one communication network using multiple identities. Various examples specifically relate to co-scheduling paging occasions associated with multiple identities.

BACKGROUND

Mobile communication using wireless communication devices is widespread. Some wireless communication devices (user equipment, UE) are capable of connecting to at least one communication network using multiple identities. Such UEs can have, e.g., multiple universal subscriber identity modules (USIMs). Hence, sometimes, these UEs capable of connecting to at least one communication network using multiple identities are referred to multi-USIM UEs.

To reduce energy consumption, UEs can sometimes operate in an idle mode. In the idle mode, a data connection with the communication network—previously set up by connecting to the communication network—is typically released. As such, the idle mode is distinguished against a connected mode in which the data connection is set up and data can be communicated between the communication network and the UE along the data connection. When the UE operates in idle mode, the communication network can trigger a transition from idle mode to connected mode. More specifically, this transition can be triggered by downlink (DL) paging signals that are transmitted by a base station (BS) of a radio access network (RAN) of the communication network. The paging signals are transmitted in accordance with a timing of paging occasions (POs). The UE is configured to monitor for paging signals at the POs.

According to reference implementations, the timing of the POs is determined based on an identity of a UE. For example, for a cellular communication network according to the 3rd Generation Partnership Project (3GPP) 4G protocol, the timing of the POs is determined based on the international mobile subscriber identity (IMSI), by calculating the modulus 1024 (sometimes also called UE identity index value). See 3GPP Technical Specification (TS) 36.304, version 15.0.0 (2018 Jul. 6). For example, according to the 3GPP 5G protocol, the timing of the POs is determined based on the temporary mobile subscriber identity (5G-S-TMSI) modulus 1024. See 3GPP TS 36.304 or TS 38.304 (Version 15.0.0).

It has been observed that control signaling overhead and energy consumption at the UE and operational complexity at the communication network can increase, when paging a multi-USIM UE.

SUMMARY

Therefore, a need exists for advanced techniques of paging a UE capable of connecting to a communication network using multiple subscriber identities. In particular, a need exists for techniques, which overcome or mitigate at least some of the above-identified restrictions and drawbacks.

This need is met by the features of the independent claims. The features of the dependent claims define embodiments.

A method of operating a wireless communication device capable of connecting to at least one communication network using multiple identities includes connecting to the at least one communication network using a first identity. The method also includes connecting to the at least one communication network using a second identity. The method further includes transmitting a request to co-schedule paging occasions associated with the first identity and with the second identity.

A computer program or a computer-program product includes program code. At least one processor can load and execute the program code. Upon executing the program code, the at least one processor performs a method of operating a wireless communication device capable of connecting to at least one communication network using multiple identities. This method includes connecting to the at least one communication network using a first identity. The method also includes connecting to the at least one communication network using a second identity. The method further includes transmitting a request to co-schedule paging occasions associated with the first identity and with the second identity.

A wireless communication device includes control circuitry capable of connecting to at least one communication network using multiple identities. The control circuity is configured to connect to the at least one communication network using a first identity. The control circuitry is further configured to connect to the at least one communication network using a second identity. The control circuitry is further configured to transmit a request to co-schedule paging occasions associated with the first identity and with the second identity.

A method of operating a node of a communication network includes connecting to a wireless communication device using a second identity. The wireless communication device is connected to the communication network or a further communication network using a first subscriber identity. The method also includes receiving a request to co-schedule paging occasions associated with the first identity and with the second identity.

A computer program or a computer-program product includes program code. At least one processor can load and execute the program code. Upon executing the program code, the at least one processor performs a method of operating a node of a communication network. The method includes connecting to a wireless communication device using a second identity. The wireless communication device is connected to the communication network or a further communication network using a first identity. The method also includes receiving a request to co-schedule paging occasions associated with the first identity and with the second identity.

A node of at least one communication network includes control circuitry configured to connect to a wireless communication device using a second identity, the wireless communication device being connected to the communication network or a further communication network using a first identity; and to receive a request to co-schedule paging occasions associated with the first identity and with the second identity.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
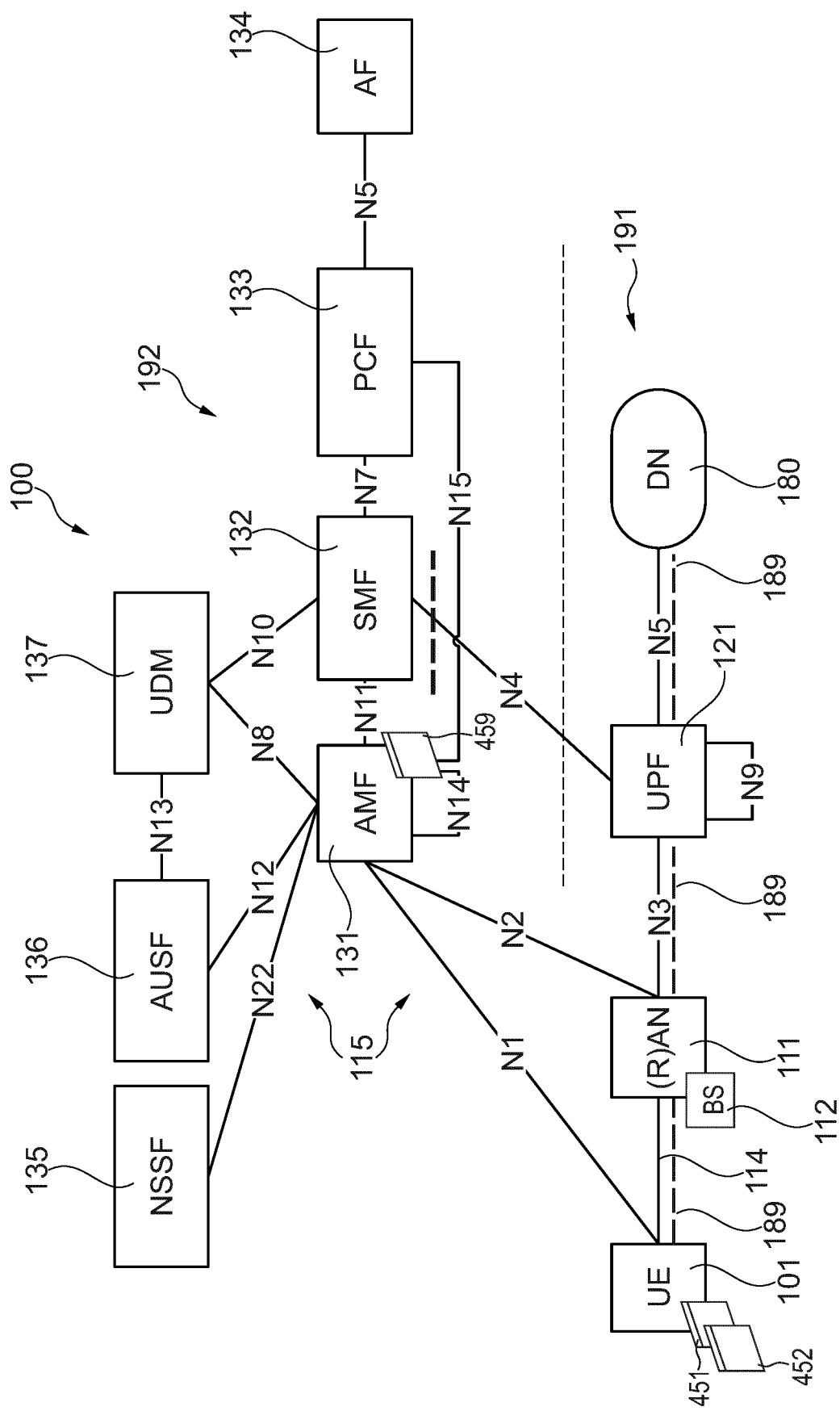
FIG. 1 schematically illustrates a cellular network according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various aspects relate to a communication system. For example, the communication system may be implemented by a UE and a BS of a communication network, e.g., of a cellular network. The communication system may include a wireless link between the UE and the BS. DL signals may be transmitted by the BS and received by the UE. Uplink (UL) signals may be transmitted by the UE and received by the BS.

Hereinafter, techniques of operating a UE in various modes are described. The modes may include a connected mode and an idle mode. Further, hereinafter, techniques of transitioning or triggering transition between the multiple mode, e.g., from idle mode to connected mode are described.

A data connection may be established between the UE and a network in the connected mode; transmission of data—including application data or higher-layer control data, e.g., Layer 3 control data—may be implemented using the data connection. Differently, the data connection may be released in the idle mode.

In the idle mode, it may not be possible to directly commence with a data transmission. Rather, the UE may be required to first connect to the communication network, e.g., by re-establishment of the data connection. To trigger the UE to reconnect, a DL paging signal may be communicated. The paging signal may be communicated in accordance with a timing of POs.

According to various examples, rules for determining the timing of POs are described.

According to some examples, multiple paging signals may be communicated in an associated paging procedure, e.g., a paging indicator and a paging message. A paging procedure may include the following actions performed at the UE: (i) monitor for a paging indicator, e.g., decode a DL control channel of the wireless link between the BS and the UE at the POs; and (ii) monitor for a paging message if the paging indicator is received, e.g., decode a DL shared channel to receive a paging message, to thereby confirm if the paging indicator was intended for the specific UE or not.

Various examples described herein relate to UEs that are capable of connecting to the communication network using two or more identities of the UE.

As a general rule, the term identity of the UE as used herein may refer to an identity associated with a subscriber associated with the UE, i.e., a subscriber identity. The identity may also refer to a temporary identity assigned to the UE, e.g., Temporary Mobile Subscription Identity (TMSI) or other UE assigned temporary identity.

For example, such UEs could comprise multiple USIMs on UICCs or embedded UICCs or another type of identity hardware. Hereinafter, such UEs that are capable of connecting to the communication network using multiple identities will be referred to as multi-USIM UEs.

As a general rule, multi-USIM UEs can connect to the same communication network or to different communication networks using their multiple identities. For instance, some scenarios are described herein in which a multi-USIM UE connects to different communication networks, implemented by core networks of cellular communication networks, wherein the multiple core networks share a common RAN. RAN sharing is becoming a more and more popular network deployment, since the operators can share the investment to get national coverage. It would also be possible that multi-USIM UEs connect via different RANs.

As a general rule, multi-USIM Ues that can benefit from the techniques described herein can have one or more communication interfaces. For example, it would be possible that a multi-USIM UE has a first communication interface configured to connect to a communication network using a first identity and to communicate with the first communication network based on this connection, and further comprises a second communication interface configured to connect to and communicate with a second communication network. For example, each one of the first and second communication interfaces can have an analog front end and a digital front end. Encoding and modulating and decoding and demodulating can be performed independently by each one of the multiple communication interfaces. In another, typical implementation, UEs can have only one communication interface, sometimes called "single radio". To be able to communicate with more than one communication network, time multiplexing can be employed. Single radio multi-USIM UEs tend to be less complex and simpler in design.

The different identities of a multi-USIM UE are typically associated with different subscriptions at respective communication network. Such subscriptions are associated with a unique identity, e.g., the IMSI, and a unique service agreement. For example, policies and charging and/or traffic shaping for telephone calls, short messaging services and packet data can be dependent on the respective service model. As a general rule, if the multi-USIM UE connects to at least one communication network using a first identity, then a respective IP address, a unique mobile station international subscriber directory number (MSISDN), and a unique data connection with the communication network can be provisioned. Hence, it can be said that a multi-USIM UE, from a network perspective, will be perceived as two independent UEs.

Various techniques are based on the finding, that such behavior of multi-USIM UEs can have an impact on paging. In particular, paging is in accordance with the timing of POs, wherein the timing of the POs is determined based on an identity of the respective UE. For example, for 3GPP 4G, the timing of the POs is determined based on the IMSI; wherein for 3GPP 5G, the timing of the PO is determined based on the 5G-S-TMSI. Because the multi-USIM UE—as explained above—is perceived as two separate UEs from a network perspective, paging will be implemented essentially independently for each identity of the multi-USIM identities. This can cause inefficiencies, e.g., effectively doubling the amount of control signaling in radio measurements for the same wireless link, in particular in a scenario where the multi-USIM UE is connected through one or more core networks through one and the same RAN.

According to various examples described herein, an improved paging can be implemented for multi-USIM UEs, in particular (i) for scenarios where multiple subscriptions of the multi-USIM UE are handled by the same operator or (ii) for scenarios where the operators associated with the multiple subscriptions use the same RAN. In scenario (i), it would be possible that a single operator uses a single RAN and a single core network, but two independent UE contexts. The two UE contexts are stored in the same core network. In scenario (ii) it would be possible that two operators share the same RAN, but operate different core networks, e.g., implemented as physically separate core networks or virtual core networks. Here, the two independent UE contexts are stored in the two different core networks.

According to examples, the improved paging is achieved by a multi-USIM UE requesting the communication network to use the same timing of POs for a second identity of the multi-USIM UE, as for a first identity of the multi-USIM UE. In other words, according to various examples, the multi-USIM UE can be configured to transmit a request to co-schedule POs associated with the first identity and with the second identity (co-scheduling request). The BS or any other appropriate node of a communication network can then be configured to co-schedule the POs.

Co-scheduling POs can mean that the POs occur contemporaneously, e.g., without any time shift. The timing of POs that are co-scheduled may be determined using a single, common rule or calculation. Co-scheduling can mean that paging signals are shared between the first identity and the second identity. Co-scheduling can mean that the intended receiver such as the multi-USIM UE—and, in particular, a single-radio multi-USIM UE—can be able to receive all relevant paging signals for multiple identities at the co-scheduled POs.

As a general rule, there are multiple options available for implementing the co-scheduling request. For example, it would be possible that the co-scheduling request is transmitted when connecting to the at least one communication network using the second identity. Then, it would be possible that the result of the IMSI modulus 1024 calculation (for 3GPP 4G), or the result of the 5G-S-TMSI modulus 1024 calculation (for 3GPP 5G) that is based on the first identity is included as an information element in a corresponding control message. This corresponds to the respective UE identity index value (see 3GPP TS 36.413). Alternatively or additionally, it would be possible to implement the request by an indicator indicative of the UE being a multi-USIM UE, i.e., a UE that is capable to connect to at least one communication network using a first identity and a second identity. For example, the indicator could be a flag (i.e., a Boolean variable), that takes the value TRUE if the UE is a multi-USIM UE and takes the value FALSE if the UE is not a multi-USIM UE. Using a request to co-schedule comprising an indicator indicative of the first identity, wherein the indicator comprises a modulus calculation result of the first identity or a modulus calculation result of a temporary identity associated with the first identity, may enhance privacy. In particular, the communication network may not receive information allowing to determine the first identity. The result of the modulus calculation may have been stored previously for another purpose. Thus, using the modulus calculation may reduce additional effort for generating the request. The claimed method may allow for reconfiguring only one UE. Thus, using a UE with a first and a second identity in a communication network may be easy to implement.

As a general rule, the at least one communication network may accept or reject the co-scheduling request. If the request is rejected, the multi-USIM UE can fall back to using reference implementations, according to which first POs associated with the first identity and second POs associated with the second identity are not co-scheduled.

If the co-scheduling request is acknowledged, then, one and the same PO can be monitored for paging signals that can trigger a reconnection using the first identity and that can also trigger a reconnection using the second identity. Simply speaking, the same POs will be monitored for both identities. Then, if a paging indicator is received on a given one of the POs, the UE can start to decode the physical downlink shared control channel (PDSCH) to attempt receiving a paging message. Then, the UE, upon receiving a paging message, can check whether a value of an information element of the paging message is associated with the first identity or with the second identity. Depending on this check, the UE can then reconnect to the at least one communication network using either the first identity or the second identity.

As a general rule, it would be possible to determine the timing of the POs in accordance with the UE identity index value. For example, the timing of the POs could be determined based on either the first identity, or based on the second identity. It would also be possible that the timing of the POs is determined in another manner, e.g., static timing related to static "UE Identity Index" or selected from predefined candidate timings, e.g., reserved for multi-USIM UEs; in such a scenario, the timing of the POs could be independent of the first identity and independent of the second identity.

FIG. 1 schematically illustrates a cellular network 100. The example of FIG. 1 illustrates the cellular network 100 according to the 3GPP 5G architecture. Details of the 3GPP 5G architecture are described in 3GPP TS 23.501, version 1.3.0 (2017 September). While FIG. 1 and further parts of the following description illustrate techniques in the 3GPP 5G framework of a cellular network, similar techniques may be readily applied to other communication protocols. Examples include 3GPP LTE 4G—e.g., in the MTC or NB-IOT framework—and even non-cellular wireless systems, e.g., an IEEE Wi-Fi technology.

In the scenario of FIG. 1, a UE 101 is connectable to the cellular network 100. For example, the UE 101 may be one of the following: a cellular phone; a smart phone; an IOT device; a MTC device; a sensor; an actuator; etc.

The UE 101 is a multi-USIM UE 101: the UE 101 is capable of connecting to the cellular network—or optionally a further cellular network (not illustrated in FIG. 1)—using two identities 451, 452.

The UE 101 is connectable to a core network (CN) 115 of the cellular network 100 via a RAN 111, typically formed by one or more BSs 112 (only a single BS 112 is illustrated in FIG. 1 for sake of simplicity). A wireless link 114 is established between the RAN 111—specifically between one or more of the BSs 112 of the RAN 111—and the UE 101.

The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data network 180, e.g., the Internet or a Local Area Network. Application data can be communicated between the UE 101 and one or more servers on the data network 180.

The cellular network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: connection management sometimes also referred to as registration management; NAS termination; connection management; reachability management; mobility management; connection authentication; and connection authorization. For example, the AMF 131 controls CN-initiated paging of the UE 101, if the respective UE 101 operates in idle mode. The AMF 131 may trigger transmission of paging signals to the UE 101; this is typically time-aligned with POs. After UE registration to the network, the AMF 131 creates a UE context 459 and keeps this UE context, at least as long as the UE 101 is registered to the network. The AMF 131 also provides the UE 101 with a temporary identity, the S-TMSI.

A data connection 189 is established by the SMF 132 if the respective UE 101 operates in a connected mode. The data connection 189 is characterized by UE subscription information hosted by the UDM 137. To keep track of the current mode of the UE 101, the AMF 131 sets the UE 101 to ECM connected or ECM idle. During ECM connected, a non-access stratum (NAS) connection is maintained between the UE 101 and the AMF 131. The NAS connection implements an example of a mobility control connection. The NAS connection may be set up in response to paging of the UE 101.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc. As such, the AMF 131 and the SMF 132 both implement CP mobility management needed to support a moving UE.

The data connection 189 is established between the UE 101 via the RAN 111 and the UP 191 of the CN 115 and towards the DN 180. For example, a connection with the Internet or another packet data network can be established. To establish the data connection 189, i.e., to connect to the cellular network 100, it is possible that the respective UE 101 performs a random access (RACH) procedure, e.g., in response to reception of a paging signal. A server of the DN 180 may host a service for which payload data is communicated via the data connection 189. The data connection 189 may include one or more bearers such as a dedicated bearer or a default bearer. The data connection 189 may be defined on the RRC layer, e.g., generally Layer 3 of the OSI model of Layer 2.

Figure 2:
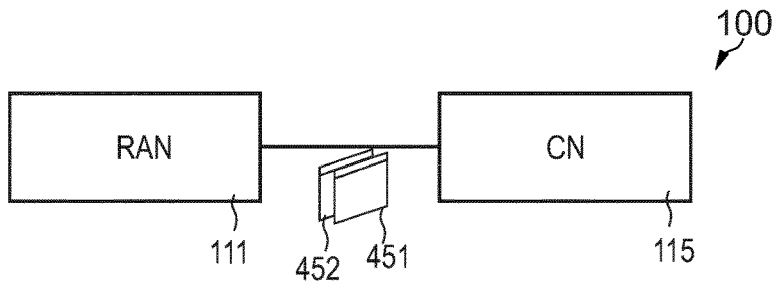
FIG. 2 schematically illustrates a cellular network comprising a core network and a RAN according to various examples.

FIG. 2 illustrates aspects in connection with the multi-USIM UE 101 connecting to at least one communication network. In the example of FIG. 2, the UE 101 connects to one and the same CN 115 using both identities 451, 452. This connection is through one and the same RAN 111. In such a scenario, multiple data connections 189—each one associated with a respective identity 451, 452—may be set-up.

Figure 3:
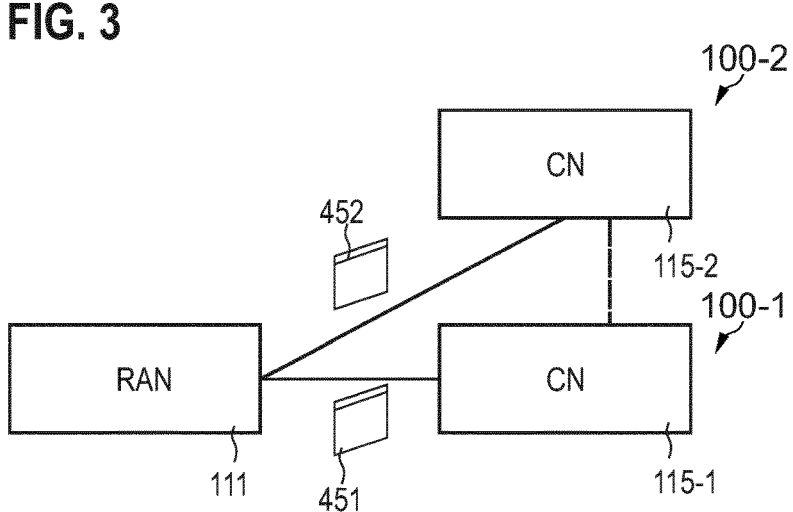
FIG. 3 schematically illustrates a first cellular network comprising a first core network and a second cellular network comprising a second core network, both the first core network and the second core network being connected to a common RAN according to various examples.

FIG. 3 illustrates aspects with respect to the multi-USIM UE 101 connecting to at least one communication network. In the example of FIG. 3, the UE 101 connects to the CN 115-1 using the identity 451; and connects to the CN 115-2 using the identity 452. The connection to both CNs 115-1, 115-2 is through a shared RAN 111. Multiple data connections to the CNs 115-1, 115-2 can be established.

In the example of FIG. 3 there is a data signaling connection established between the two CNs 115-1, 115-2. This is optional. In various scenarios it is not required to provide such control signaling capability between the two CNs 115-1, 115-2. Rather, the multi-USIM UE 101 could coordinate co-scheduling of POs.

Figure 4:
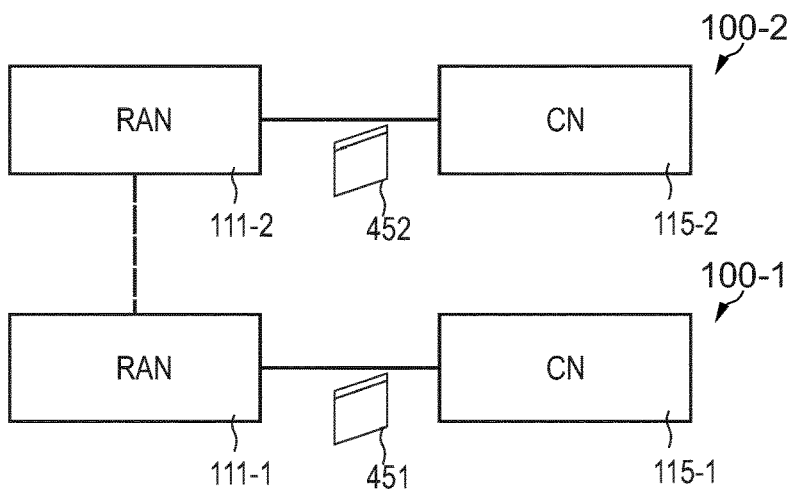
FIG. 4 schematically illustrates a first cellular network comprising a first core network and a first RAN and furthermore illustrates a second cellular network comprising a second core network and a second RAN.

FIG. 4 illustrates aspects with respect to the multi-USIM UE 101 connecting to at least one cellular network. In the example of FIG. 4, the UE 101 connects to the CN 115-1 using the identity 451; and connects to the CN 115-2 using the identity 452. The connection to the CN 115-1 is through the RAN 111-1; and the connection to the CN 115-2 is through the RAN 111-2. In the scenario of FIG. 4, there is a control signaling connection implemented between the RAN 111-1 and the RAN 111-2. Alternatively or additionally, it would be possible that a control signaling connection is implemented between the CN 115-1 and the CN 115-2. Multiple data connections to the CNs 115-1, 115-2 can be established.

In the scenarios illustrated in FIG. 2, FIG. 3, and FIG. 4, it is possible to time-align (i) paging of the UE 101 to trigger a connection using the identity 451 with (ii) paging of the UE 101 to trigger a connection using the identity 452. This is because, in the scenarios of FIG. 2 and FIG. 3, the RAN 111 implements the paging associated with both identities 451, 452; and in the scenario of FIG. 4, there is the control signaling connection implemented between the two RANs 111-1, 111-2. Therefore, it is possible to co-schedule POs in all scenarios of FIG. 2, FIG. 3, and FIG. 4. Details with respect to the co-scheduling are explained later on.

Figure 5:
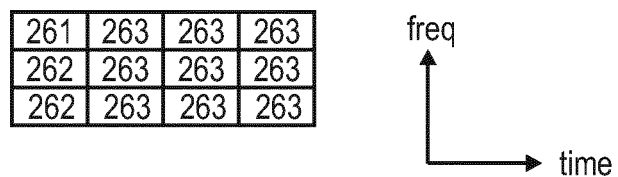
FIG. 5 schematically illustrates multiple channels implemented on a wireless link between a UE and a RAN according to various examples.

FIG. 5 illustrates aspects with respect to channels 261-263 implemented on the wireless link 114. The wireless link 114 implements a plurality of channels 261-263. The resources of the channels 261-263 are offset from each other, e.g., in frequency domain and/or time domain. For example, separate carriers may be used for different ones of the channels 261-263; alternatively, it would also be possible to use a carrier with multiple subcarriers, e.g., according to Orthogonal Frequency Division Multiplexing (OFDM).

A first channel 261 may carry paging indicators, which enable the cellular network 100—e.g., the AMF 131—to page a UE 101 during a PO. Typically, the paging indicators are communicated on a Physical Downlink Control Channel (PDCCH).

Further, a second channel 262 is associated with a payload messages carrying higher-layer messages. Higher-layer messages may include Radio Resource Control (RRC) control messages, e.g., paging messages. The paging messages can be indicative of the identities of the particular UE to be paged.

Further, a third channel 263 can be a broadcast channel. Here, control information may be provided by the BS 112, e.g., synchronization signals, reference signals, system information, etc.

Figure 6:
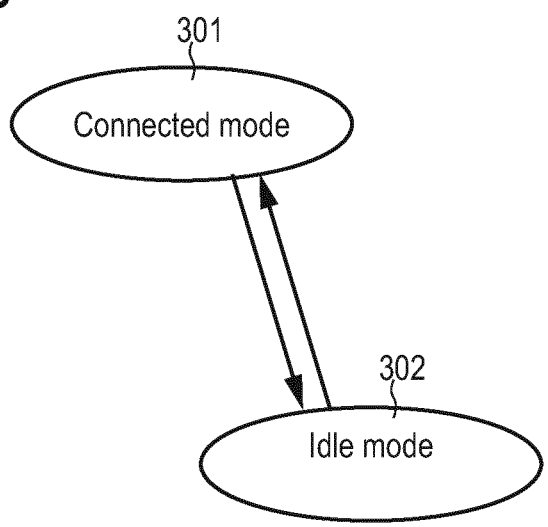
FIG. 6 schematically illustrates a connected mode and an idle mode in which a UE can operate according to various examples.

FIG. 6 illustrates aspects with respect to different modes 301-302 in which the UE 101 can operate. Example implementations of the operational modes 301—302 are described, e.g., in 3GPP TS 38.300, e.g., version 15.0.0.

During a connected mode 301, the data connection 189 is set up. For example, a default bearer and optionally one or more dedicated bearers may be set up between the UE 101 and the cellular network 100. A wireless interface of the UE 101 may persistently operate in an active state, or may implement a discontinuous reception (DRX) cycle.

To achieve a power reduction, it is possible to implement the idle mode 302. When operating in the idle mode 302, the UE 101 is configured to monitor for paging indicators and, optionally, paging messages in accordance with a timing of POs. The timing of the POs may be aligned with a DRX cycle in idle mode 302. This may help to further reduce the power consumption—e.g., if compared to the connected mode 301. In the idle mode 302, the data connection 189 is not maintained, but released.

Figure 7:
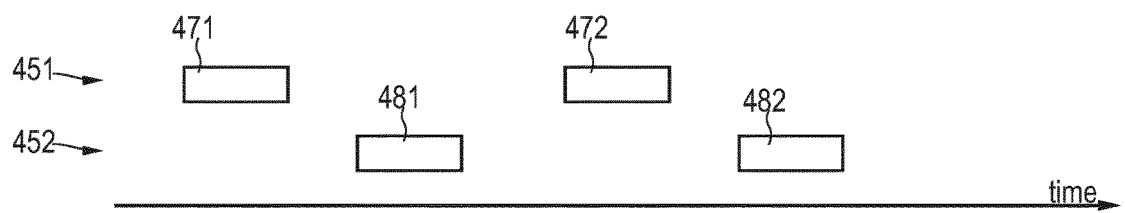
FIG. 7 schematically illustrates reference implementations of non-co-scheduled POs associated with multiple subscriber identities.

FIG. 7 illustrates aspects with respect to first POs 471-472 and with respect to second POs 481-482. The POs 471-472 are associated with the identity 451; and the POs 481-482 are associated with the identity 452. This means that the UE 101 will monitor whether paging indicators and paging messages indicative of the identity 451 are transmitted during the POs 471-472; and that the UE 101 will monitor whether paging indicators and paging messages indicative of the second identity 452 are transmitted during the POs 481-482.

For example, if a paging message is received that includes an information element having a value associated with the first identity 451 upon receiving an associated paging indicator during the PO 471, this will trigger the UE 101 to reconnect using the first identity 451. Hence, regarding the connection using the identity 451, this triggers a transition from the idle mode 302 to the connected mode 301.

As illustrated in FIG. 7, the POs 471, 472 are offset in time domain vis-à-vis the POs 481, 482. I.e., the POs 471-472 and the POs 481-482 are not co-scheduled. For example, this can be due to the calculation of the first identity 451 modulus 1024 yielding another result if compared to the calculation of the second identity 452 modulus 1024. As a general rule, the timing of the POs 471-472 is determined based on the first identity 451; while the timing of the POs 481-482 is determined based on the second identity 452. Because the first identity 451 is generally different from the second identity 452 in the case of a multi-USIM UE 101, the timing of the POs 471-472 and the timing of the POs 481-482 differs.

According to various examples, it is possible to co-schedule POs associated with the first identity 451 and associated with the second identity 452. A corresponding scenario is illustrated in connection with FIG. 8.

Figure 8:
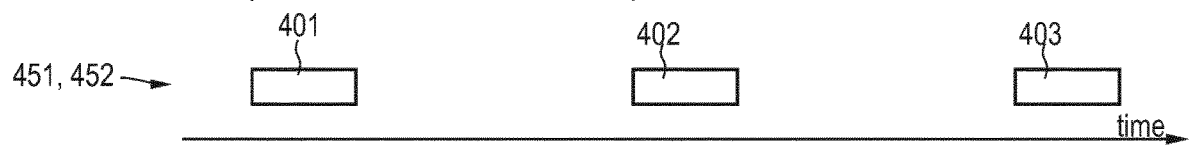
FIG. 8 schematically illustrates co-scheduled POs associated with multiple subscriber identities according to various examples.

FIG. 8 illustrates aspects with respect to POs 401-403 associated with, both, the first identity 451 and the second identity 452. Accordingly, in the scenario of FIG. 8, the POs 401-403 associated with the first identity 451 and the second identity 452 are co-scheduled.

Such co-scheduling has the following impact on the operation of the multi-USIM UE 101: For example, if the UE receives a paging indicator during the PO 402, and subsequently receives a paging message, it can check whether a value of an information element of that paging message is associated with the first identity 451 or the second identity 452. Then, the UE 101 can re-connect using either the first identity 451 (if the value of the information element of the paging messages associated with the first identity 451), or can reconnect using the second identity 452 (if the value of the information element of the paging messages associated with the second identity 452).

From a comparison of FIG. 7 and FIG. 8 (also see the vertical dotted lines which provide a guide to the eye), it follows that the timing of the POs 401-403 is determined based on the first subscriber identity 451; but not determined based on the second identity 452.

All this helps to more efficiently page the UE 101: less time-frequency resources need to be reserved for the paging due to the co-scheduling.

All this also helps to efficiently implement the UE 101 hardware operation: the UE 101 may not be required to monitor different POs 471-472 and 481-482 for the multiple identities 451, 452.

Figure 9:
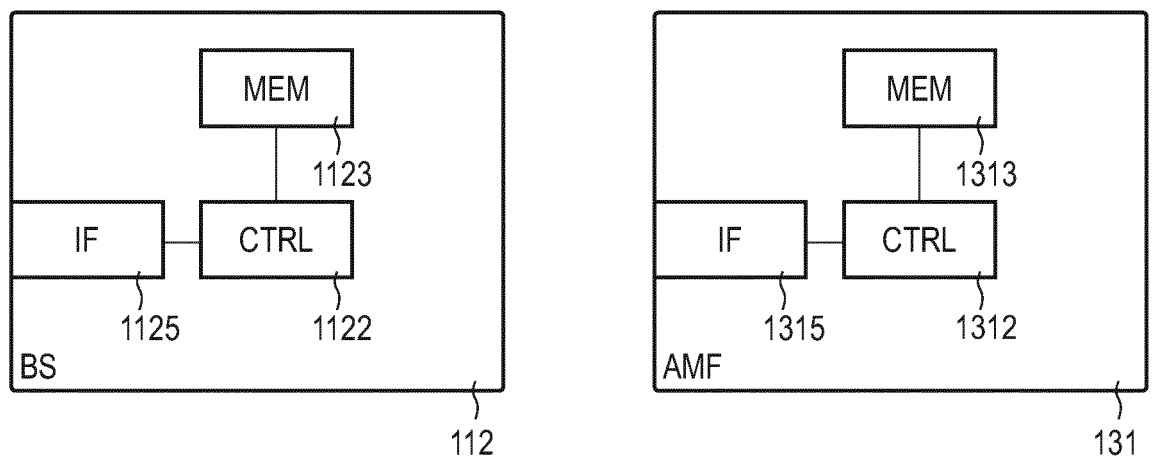
FIG. 9 schematically illustrates a BS according to various examples.

FIG. 9 schematically illustrates the BS 112. The BS 112 includes an interface 1125. For example, the interface 1125 may include an analog front end and a digital front end. The interface 1125 or a separate interface not shown in FIG. 9 e.g. a fiberoptic connection can also be used for signaling towards the CN 115. The BS 112 further includes control circuitry 1122, e.g., implemented by means of one or more processors and software. For example, program code to be executed by the control circuitry 1122 may be stored in a non-volatile memory 1123. In the various examples disclosed herein, various functionality may be implemented by the control circuitry 1122 by executing the program code, e.g.: receiving a request to co-schedule POs associated with multiple identities; co-scheduling POs associated with multiple identities; transmitting an acknowledgment of a request to co-schedule POs associated with multiple identities; providing an indicator indicative of a first identity to context information of the UE associated with the second identity; transmitting paging signals in accordance with POs; determining a timing of POs based on an identity of a UE; etc.

FIG. 9 also schematically illustrates the AMF 131. The AMF 131 includes an interface 1315. For example, the interface can be for signaling towards the RAN 111. The AMF 131 also includes control circuitry 1312, e.g., implemented by means of one or more processors and software. For example, program code to be executed by the control circuitry 1312 may be stored in a non-volatile memory 1313. In the various examples disclosed herein, various functionality may be implemented by the control circuitry 1312 by executing the program code, e.g.: receiving a request to co-schedule POs associated with multiple identities; co-scheduling POs associated with multiple identities; transmitting an acknowledgment of a request to co-schedule POs associated with multiple identities; providing an indicator indicative of a first identity to context information of the UE associated with the second identity; triggering transmission of paging signals in accordance with POs; determining a timing of POs based on an identity of a UE; etc.

Generally, also other nodes of the cellular network 100 may be configured in a manner comparable to the configuration of the AMF 131, e.g., the SMF 132.

Figure 10:
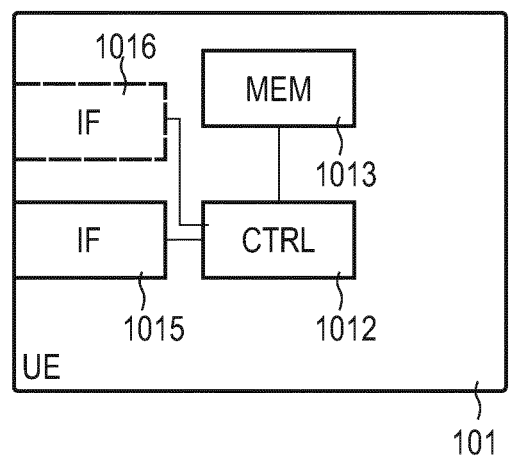
FIG. 10 schematically illustrates a multi-USIM UE according to various examples.

FIG. 10 schematically illustrates the UE 101. In the example of FIG. 10, the UE 101 includes a first interface 1015 and a second interface 1016. For example, the first interface 1015 may include an analog front end and a digital front end. Likewise, the second interface 1016 may include a respective analog front end and a digital front end. For example, the UE 101 may be configured to connect to the cellular network 100 and to communicate with the CN 115, 115-1 using the first identity 451 via the communication interface 1015. The UE 101 can be configured to connect to and communicate with the CN 115 or another CN 115-2 (cf. scenarios of FIG. 2, FIG. 3, and FIG. 4) using the second identity 452 via the communication interface 1016.

As a general rule, it is optional that the multi-USIM UE 101 includes multiple communication interfaces 1015-1016 associated with the multiple identities 451, 452. In other examples, it would be possible that the connection and communication using multiple identities are implemented using a single communication interface (not illustrated in FIG. 10).

The UE 101 also includes control circuitry 1012, e.g., implemented by means of one or more processors and software. For example, program code to be executed by the control circuitry 1012 may be stored in a non-volatile memory 1013. In the various examples disclosed herein, various functionality may be implemented by the control circuitry 1012 by executing the program code, e.g.: transmitting a request to co-schedule POs associated with multiple identities; monitoring for and receiving an acknowledgment of such request; determining a timing of POs based on a identity; monitoring for paging signals (e.g., paging indicators and/or paging messages); connecting to at least one communication network using one or more identities; communicating with the at least one communication network using the multiple identities; etc.

Figure 11:
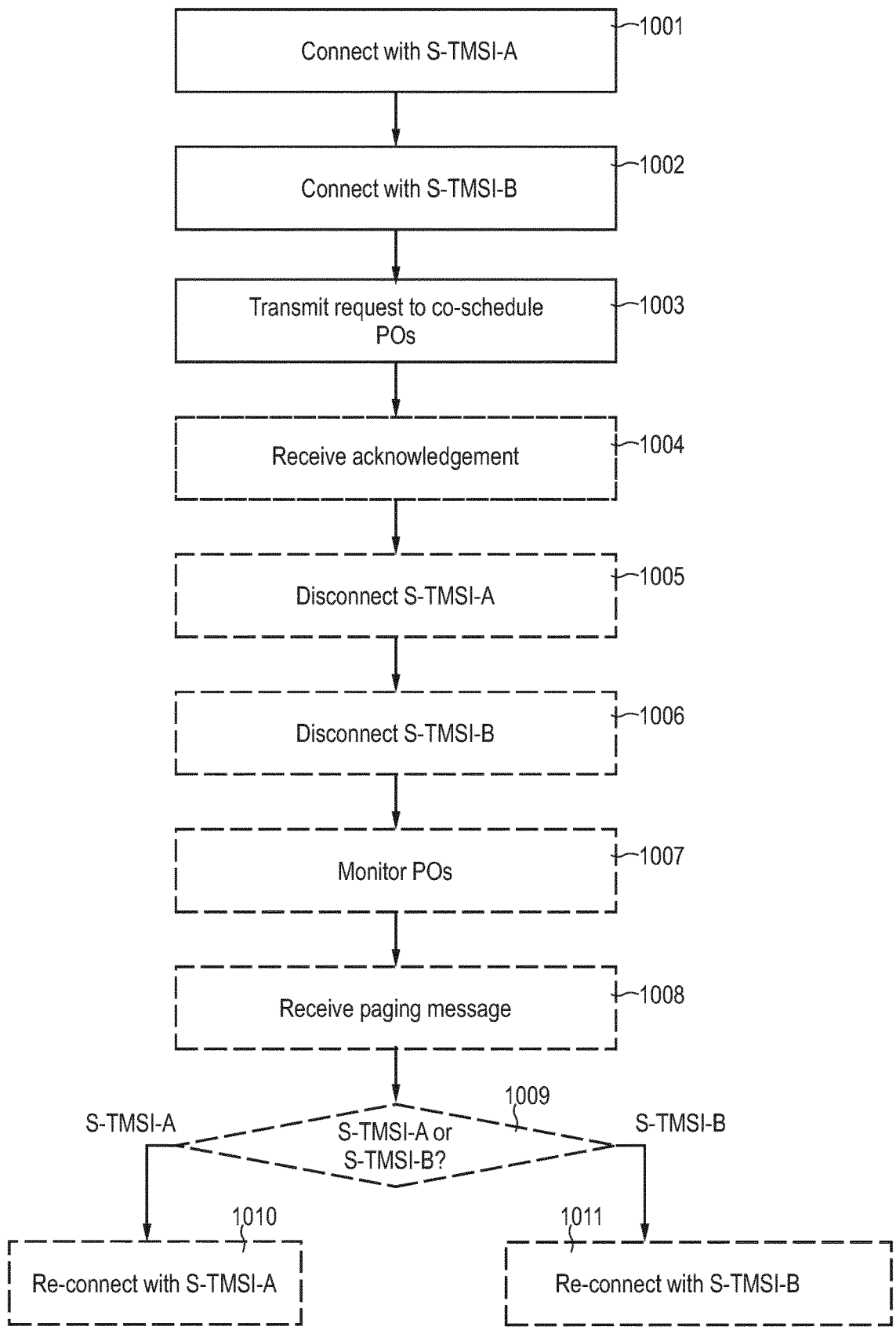
FIG. 11 is a flowchart of a method according to various examples.

FIG. 11 is a flowchart of a method according to various examples. The method according to FIG. 11 generally illustrates aspects with respect to co-scheduling POs associated with multiple identities. The method according to FIG. 11 generally relates to monitoring and receiving paging signals associated with multiple identities on co-scheduled POs.

In FIG. 11, optional blocks are labeled with dashed lines.

The method according to FIG. 11 is related to operating a multi-USIM UE. For instance, the method of FIG. 11 could be implemented by the UE 101 as discussed in connection with FIG. 10. Hereinafter, various examples will be described in connection with a scenario in which the method of FIG. 11 is executed by the control circuitry 1012 of the UE 101, upon loading program code from the memory 1013; however, similar techniques may be readily applied to other scenarios.

At block 1011, the UE 101 connects to at least one communication network. More specifically, the UE 101 can connect to the CN 115 of the cellular network 100 (cf. FIG. 2); or can connect to the CN 115-1 of the cellular network 100-1 (cf. FIG. 3 and FIG. 4). At block 1001, the UE 101 connects using the first identity 451, labeled S-TMSI-A in FIG. 11. The connection can be implemented via the BS 112. The connection can be controlled by the AMF 131 and/or SMF 132.

As a general rule, while in the scenario of FIG. 11, directed to a 3GPP 5G use case, the 5G-GUTI or S-TMSI is used as identity when connecting, in other examples, other kinds and types of identities could be used, e.g., protected subscriber ID SUCI, the IMSI or the subscription permanent identifier (SUPI). For example, in 3GPP 4G, the IMSI or GUTI which includes both the MME-TMSI (M-TMSI) and the GUMMEI (Globally Unique MME ID) may be used. The S-TMSI is constructed based on M-TMSI and MME code (see 3GPP TS 23.003).

Connecting in block 1001 can include a random-access procedure and an RRC connection set up. For example, an RRC Connection Request control message may include the S-TMSI-A or IMSI-A (SUCI in 5G) if this is the first initial connection.

Next, at block 1002, the UE 101 connects to the at least one communication network. More specifically, the UE 101 could connect to the CN 115 of the cellular network 100 (cf. FIG. 2), or to the CN 115-2 of the cellular network 100-2 (cf. FIG. 3 and FIG. 4). Different CNs 115-1, 115-2 may implement different technology, e.g., 3GPP 4G and 5G. At block 1002, the connection is using the second identity 452, labeled S-TMSI-B in FIG. 11. Again, instead of the S-TMSI, other kinds and types of identities may be used in other examples, e.g., an IMSI or a SUCI or SUPI.

Again, block 1002 may include a random-access procedure and an RRC connection set up. For example, an RRC Connection Request control message may include the S-TMSI-B.

Next, in block 1003, a request to co-schedule POs is transmitted to the at least one communication network. These POs are to be associated with the first identity 451 and also with the second identity 452.

As a general rule, there are various options available for implementing such request. For instance, it would be possible that the request is transmitted while executing block 1001 or block 1002, i.e., as part of the connection procedure. For example, RRC control signaling may be used to implement the request. In other examples, it would be possible that the request is implemented after the connection has been established, i.e., once the UE operates in RRC connected mode 301 e.g. as part of the NAS attach procedure or registration procedure. Furthermore, the information content of the request can vary from scenario to scenario. Sometimes, a Boolean flag indicator indicative of whether the UE 101 is a multi-USIM UE or not could be sufficient to implement the request. In more complex scenarios, it would be possible that the request includes an indicator indicative of a timing of POs (e.g., a modulus calculation result), or indicative of a identity.

Next, at optional block 1004, an acknowledgment associated with the request of block 1003 is received. For example, the acknowledgement in block 1004 could be implemented by a positive acknowledgement (PACK). If the acknowledgment in block 1004 was not received, this would lead to legacy behavior. Here, the UE would monitor separate POs associated with each one of the first and second identities 451, 452 (cf. FIG. 7). Hence, the UE would monitor for first paging indicators on the first POs 471-472 associated with the first identity 451, wherein these first POs 471-472 are not associated with the second identity 452. The UE would monitor for second paging indicators on the second POs 481-482 associated with the second identity 452, wherein the second POs 481-482 are not associated with the first identity 451.

Since in the scenario of FIG. 11 the acknowledgment is received (e.g., a PACK is received, and no negative acknowledgement, NACK, is received), the UE will monitor for paging indicators on POs 401-403 associated with, both, the first identity 451, as well as with the second identity 452 (cf. FIG. 8). This is explained in connection with the following optional blocks in further detail.

At block 1005, the UE disconnects from the respective communication network to which it previously connected using the first identity 451 in block 1001. This can include an RRC connection release. The disconnection in block 1005 corresponds to a transition into the idle mode 302 from the connected mode 301, for the first identity 451. This block can also be executed directly after block 1001.

In block 1006, the UE 101 disconnects from the respective communication network to which it previously connected in block 1002. Block 1006 can again include an RRC connection release procedure. Block 1006 again corresponds to a transition from the connected mode 301 to the idle mode 302, for the second identity 452.

Next, in block 1007, the UE monitors the co-scheduled POs 401-403 for paging indicators. The timing of the POs 401-403 is determined based on the first identity 451, but not based on the second identity 452.

In response to receiving a paging indicator in block 1007, the method commences with block 1008. Due to the co-scheduling, there is ambiguity as to whether the paging indicator is for the first identity 451 or for the second identity 452. The paging indicator does not yet resolve whether the paging is for the first identity 451 or the second identity 452.

As part of block 1008, the UE 101 starts decoding the PDSCH to receive a paging message.

As a general rule: in cases in which the UE 101 includes multiple wireless interfaces 1015, 1016 (cf. FIG. 10), it would be possible that—while executing block 1007 and 1008—one of these wireless interfaces 1015, 1016 remains permanently shut-down or in a low-power mode. This helps the UE 101 to reduce power consumption. In case the UE only includes one wireless interface, then the amount of time the UE is using the interface is reduced. This helps the UE 101 to reduce power consumption.

Once the paging message is received in block 1008, in block 1009, the UE 101 checks whether a value of an information element of the paging messages is associated with the first identity 451 or with the second identity 452. Then, if the value of the information element of the paging message is associated with the first identity 451, the UE executes block 1010: here, the UE 101 reconnects to the at least one communication network using the first identity 451. If the value of the information element of the paging message is associated with the second identity 452, block 1011 is executed. Here, the UE reconnects to the at least one communication network using the second identity 452.

Block 1010 can essentially correspond to block 1001. Block 1011 can essentially correspond to block 1002.

Figure 12:
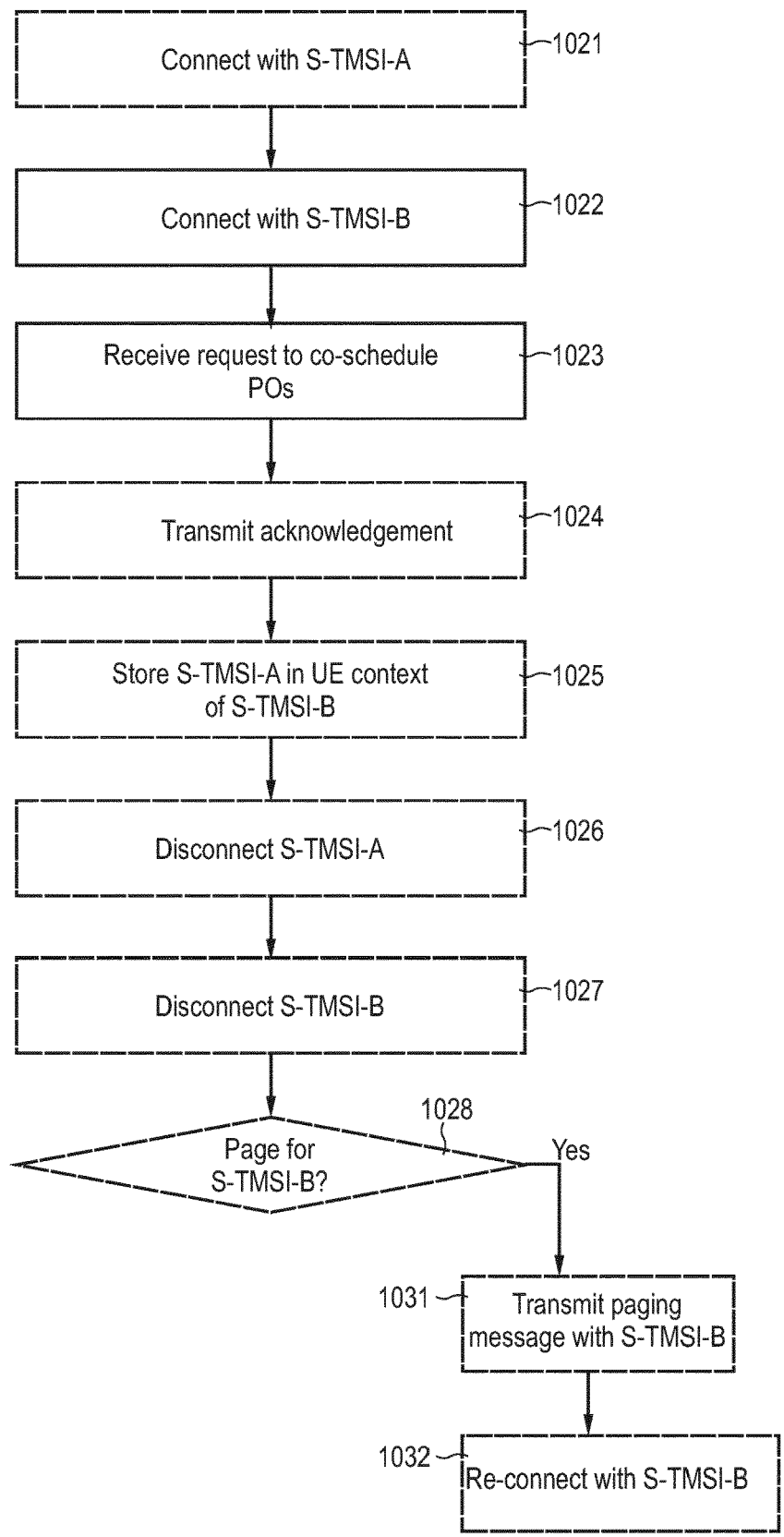
FIG. 12 is a flowchart of a method according to various examples.

FIG. 12 is a flowchart of a method according to various examples. FIG. 12 illustrates aspects with respect to co-scheduling POs associated with multiple identities. FIG. 12 could be executed by an access node of a communication network or a core network node, e.g., could be executed by the BS 112 of the RAN 111 or the AMF 131 of the cellular network 100 according to the example of FIG. 1. Hereinafter, various examples will be described with respect to an implementation in which the method according to FIG. 12 is executed by the control circuitry 1312 of the AMF 131, upon loading program code from the memory 1313. However, similar scenarios may be readily applied to other implementations in which other entities execute the method of FIG. 12, e.g., the SMF 132 and/or the BS 112. In some implementations, at least a part of the blocks according to FIG. 12 could be executed by the SMF 132 and/or the BS 112.

In the example implementation of FIG. 12, it is assumed that the AMF 131 is part of the CN 115-2 (cf. FIG. 3).

At optional block 1021, the AMF 131 connects to the UE 101 using the first identity 451. Block 1021 is interrelated to block 1001. The connection can be implemented via the BS 112 of the RAN 111.

In other examples, another AMF of another CN—e.g., the AMF of the CN 115-1 (cf. FIG. 3)—could connect to the UE 101 using the first subscriber identity 451.

At block 1022, the AMF 131 connects to the UE 101 using the second identity 452. Block 1022 is interrelated to block 1002.

At block 1023, the AMF 131 receives a request to co-schedule the POs 401-403 associated with the first identity 451 and further associated with the second identity 452. Block 1023 is interrelated to block 1003. To give an example, the request could be indicative of the first identity 451. Alternatively, the AMF 131 of the CN 115-2 could—upon receiving the request—contact the AMF 131 of the CN 115-1 to retrieve the first identity 451.

At block 1024, the AMF 131 grants the request for co-scheduling the POs 401-403 and, accordingly, transmits an acknowledgment to the UE 101. Block 1024 is interrelated to block 1004.

In a scenario in which the AMF 131 denies the request, a NACK could be transmitted.

Because the AMF 131 grants the request to co-schedule the POs 401-403, the AMF 131 will later on trigger transmission of paging indicators associated with both the first identity 451, as well as with the second identity 452 on the same, co-scheduled POs 401-403.

As will be appreciated, the AMF 131 of the CN 115-2 can—in the illustrated example—autonomously grant the request to co-schedule; i.e., involvement of the AMF 131 of the CN 115-1 is not required.

To facilitate this, at optional block 1025, the AMF 131 provides an indicator indicative of the first identity to the UE context information 459 in the CN 115-2; i.e., the UE context information 459 is natively associated with the second identity 452. By storing the UE context information 459 for the second identity 452 such that it includes an indicator indicative of the first identity 451, it becomes possible to determine the timing of the POs 401-403 when attempting to page the UE 101 to trigger a connection using the second identity 452. For example, the indicator indicative of the first identity 451 stored in the UE context information 459 associated with the second identity 452 could be the calculation of the modulus 1024 of the first identity 451 which corresponds to the timing of the co-schedule POs 401-403.

As a general rule, in some examples, the timing of the POs is independent of both the identity 451, as well as of the identity 452. The timing of the POs could be predefined or determined according to another scheme.

Next, at optional block 1026 the AMF 131 disconnects from the UE 101 using the first identity 451. Block 1026 is interrelated to block 1005. In other examples, another AMF of another CN 115 could perform the disconnection.

At optional block 1027, the AMF 131 disconnects from the UE 101 using the second identity 452. Block 1027 is interrelated to block 1006.

Next, blocks 1028-1032 implement the co-scheduling of the POs 401-403 associated with, both, the first identity 451, as well as with the second identity 452.

In particular, in block 1028, the AMF 131 checks whether a trigger criterion for paging the UE 101 to connect using the second identity 452 exists. For example, the trigger criterion could be queued data in a a DL transmit buffer exceeding a certain threshold, i.e., downlink payload data being scheduled for transmission to the UE 101.

If paging is to be executed for the second identity 452, the method commences with block 1031. At block 1031, the AMF 131 triggers the BS 112 to transmit a paging indicator and, subsequently, a paging message, wherein the value of the information element of the paging message is set to be associated with the second identity 452. This triggers the UE 101 to subsequently reconnect, in block 1032, using the second identity 452.

The timing of the POs in block 1031 can be determined based on the UE context information 459 that is natively associated with the second identity 452—which UE context information 459 includes the indicator indicative of the first identity 451, as described in block 1025. The first identity 451 governs the determination of the timing of the POs of the co-scheduled POs 401-403. As an alternative option, it would be possible that the timing of the POs is determined otherwise, e.g., is predefined or set to a value e.g. "UE Identity Index" value not related to either first 451 or second identity 452.

Figure 13:
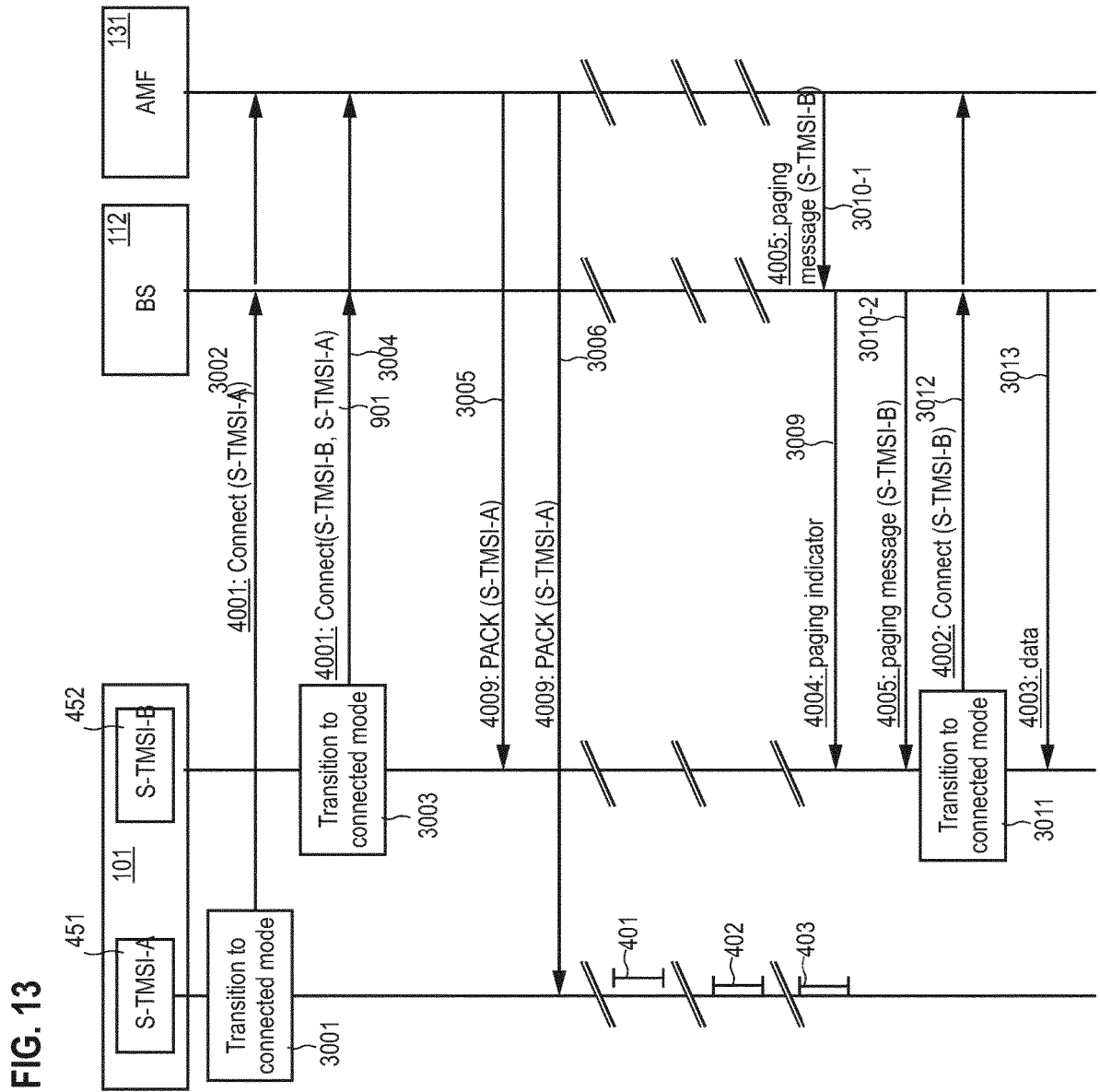
FIG. 13 is a signaling diagram according to various examples.

FIG. 13 is a signaling diagram of communication between the UE 101 and the BS 112 and the AMF 131. FIG. 13 illustrates communication associated with paging.

In FIG. 13, communication is illustrated separately for the first identity 451 and the second identity 452. For example, in scenarios in which the UE 101 includes multiple communication interfaces 1015, 1016, the communication associated with the first identity 451 could be executed via the communication interface 1015 and the communication associated with the second identity 452 could be executed via the communication interface 1016 (cf. FIG. 10).

For example, the signaling according to FIG. 13 could be used to implement the method according to FIG. 11 and/or the method according to FIG. 12.

In the example of FIG. 13, it is assumed that the UE 101 connects to the same CN 115 using the two identities 451, 452 (cf. FIG. 2). But similar techniques may be readily employed for, e.g., the scenario of FIG. 3 or FIG. 4. In those scenarios the UE 101 will interact with two different AMFs one AMF 131 in CN 115-1 and a AMF 131 second in CN 115-2.

Initially, at block 3001, the UE 101 intends to transition to the connected mode 301 for the first identity 451. Accordingly, at 3002, the UE 101 transmits a connection request 4001 using the first identity 451, e.g., an RRC Connection Request control message. The connection request 4001, in FIG. 13 includes an indicator indicative of the first identity 451.

Next, at block 3003, the UE 101 intends to transition to the connected mode 301 for the second identity 452. Accordingly, at 3004, the UE 101 connects to the cellular network 100 using the second identity 452. The UE 102 transmits a corresponding connection request 4001. The connection request 4001 includes an indicator indicative of the second identity 452. The indicator can be in the NAS message to the AMF as part of the connection establishment procedure triggered by message 4001.

Blocks 3001 and 3002 hence correspond to block 1001 (cf. FIG. 11) and block 1021 (cf. FIG. 12).

Blocks 3003-3004 hence correspond to block 1002 (cf. FIG. 11) and block 1022 (cf. FIG. 12).

Blocks 3001-3004 also include registration at the CN 115.

In the scenario of FIG. 13, the AMF 131 implements co-scheduling of the POs 401-403 associated with, both, the first identity 451, as well as the second identity 452.

Accordingly, the UE 101 monitors for paging indicators on the POs 401-403, wherein the timing of these POs 401-403 is determined based on the first identity 451. At the POs 401, 402 the UE 101 does not receive a paging indicator, because the BS 112 does not transmit a paging indicator.

At the PO 403, the BS 112 transmits a paging indicator 4004 at 3009; and the UE 101 receives this paging indicator 4004. The transmission of the paging indicator 4004 by the BS 112 is triggered by the paging message 4005 received from the AMF 131 at 3010-1. The paging message 4005 includes the UE index value so that the BS 112 can determine the timing of the PO 403. The BS 112 is not required to be aware of the co-scheduling of the POs 401-403.

Upon receiving the paging indicator 4004 at 3009, the UE 101 receives a paging message 4005 at 3010-2. The paging message 4005 includes an information element that has a value that is indicative of the second identity 452. Accordingly, at block 3011, the UE 101 transitions to the connected mode 301, from the idle mode 302, i.e., reconnects to the cellular network 100 using the connection request 4001 that is indicative of the second identity 452. The UE 101 also connects to the CN 115.

Next, at block 3013, DL data 4003—which has triggered the paging of the UE 101—is transmitted by the BS and received by the UE 101. Note that the UE 101 remains in idle mode 302 for the first identity 451.

FIG. 13 also illustrates aspects with respect to a request 901 to co-schedule the POs 401-403. In the scenario of FIG. 13, the request 901 is transmitted when connecting to the cellular network 100 using the second identity 452, at 3004. Specifically, the request 901 includes an indicator that is indicative of the first identity 451. For example, the indicator could comprise the first identity 451, or could comprise the modulus calculation of the first identity 451, e.g., the modulus 1024 calculation. To give an example, the request 901 may be implemented by an information element field included in the RRC Connection Request message that includes the indicator. The inclusion of the indicator indicative of the first identity 451 in the connection request 4001 natively associated with the second identity 452 is hence an indication that the UE 101 is a multi-USIM UE and would prefer to co-schedule the POs 401-403. Upon receiving the request 901, it would be possible that the first identity 451 is stored in the UE context information 459 associated with the second identity 452. The AMF 131 acknowledges the request 901 by transmitting positive acknowledgements 4009 at 3005 and 3006.

Figure 14:
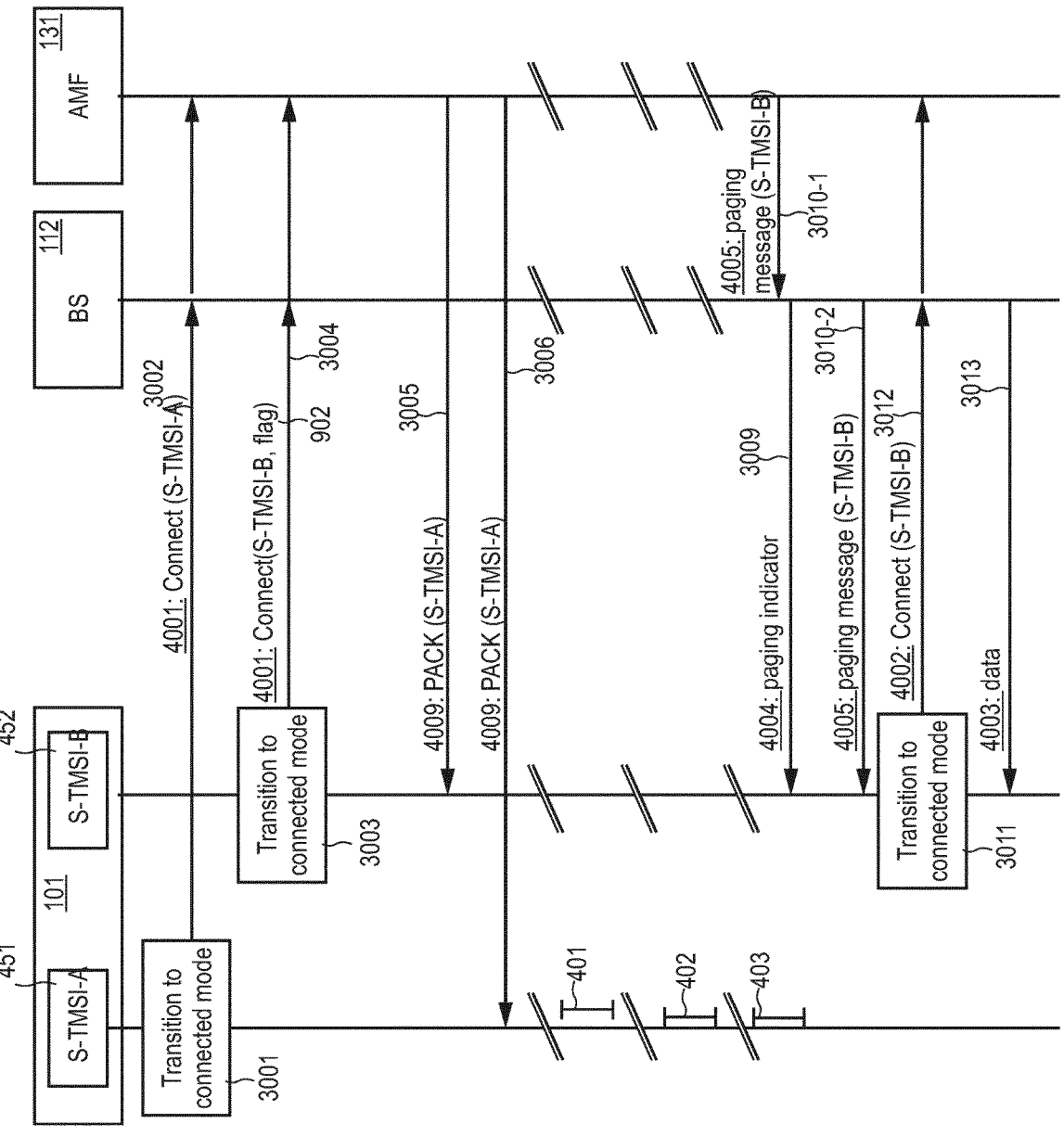
FIG. 14 is a signaling diagram according to various examples.

FIG. 14 essentially corresponds to the scenario of FIG. 13. In FIG. 14, the connection request 4001 transmitted by the UE 101 when connecting to the cellular network 100 using the second identity 452 and again includes a request 902 to co-schedule the POs 401-403. In the scenario of FIG. 14, the request 902 is implemented by a flag indicator that is indicative of the UE 101 being a multi-USIM UE. Then, the AMF 131 may conclude that the co-scheduled POs 401-403 have a timing that is to be determined based on the first identity 451.

Figure 15:
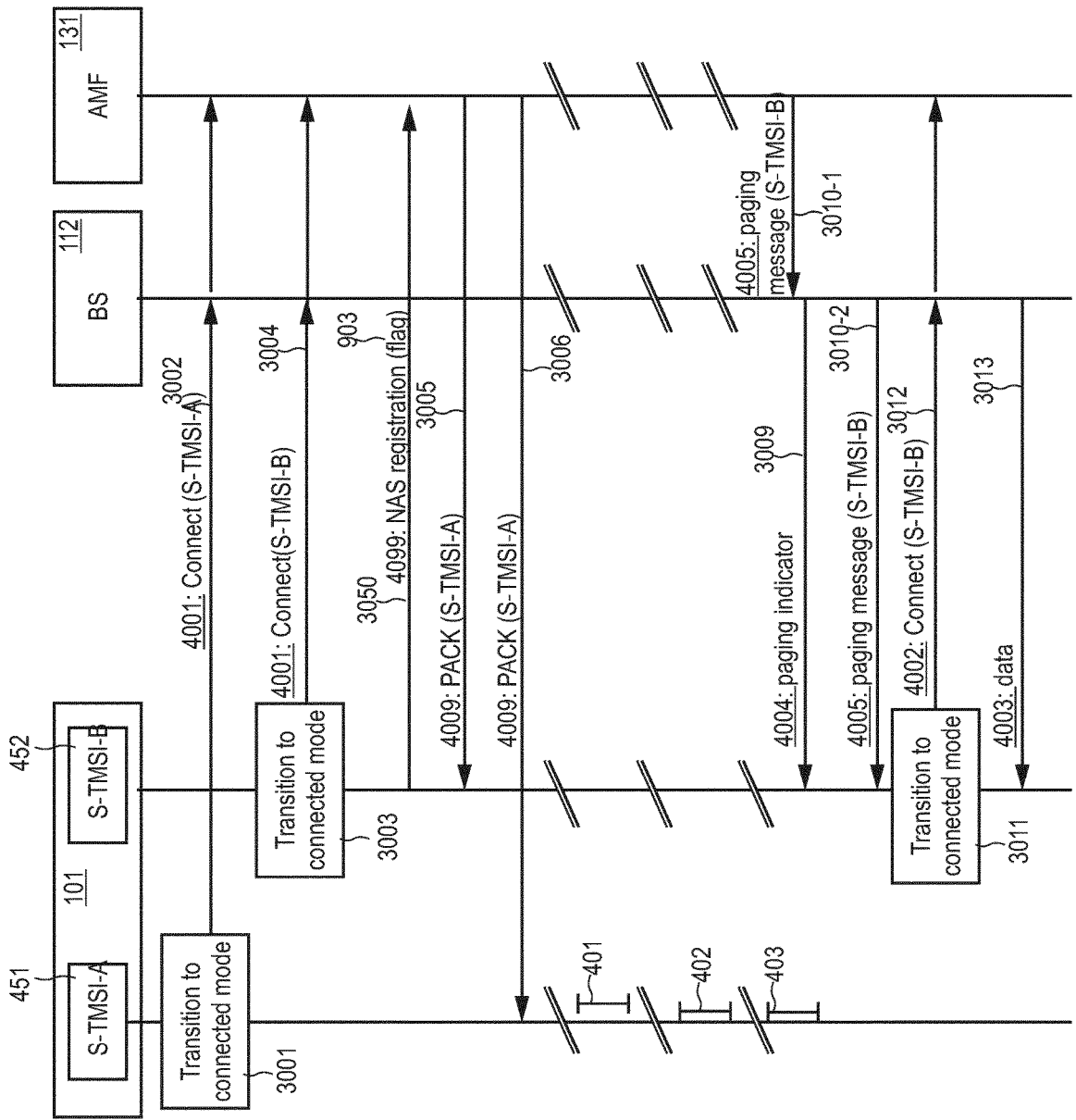
FIG. 15 is a signaling diagram according to various examples.

FIG. 15 generally corresponds to FIG. 13 and to FIG. 14. FIG. 15 illustrates yet another implementation of the request 903. In the scenario of FIG. 15, the request 903 to co-schedule the POs 401-403 is implemented as a flag included in a Non-access stratum registration message 4099, for registration at the CN 115.

The request 903 may, again, be indicative of one or more of the following: the first identity 451; the second identity 452; an indicator indicative of the UE 101 being a multi-USIM UE; etc.

Summarizing, above techniques have been described which facilitate a multi-USIM UE requesting that the same POs—i.e., using the same UE identity index value for determining the timing—are used for the various identities of the multi-USIM UE. This facilitates a more efficient paging procedure, while additionally a risk of paging collisions is mitigated.

To implement such techniques, scenarios have been described in which a parameter/indication is included in a request from the UE to the network. The parameter could be the UE identity index value, i.e., the result of the modulus calculation of one of the identities; or an indication that the UE is a multi-USIM UE.

Various examples described herein enable paging of a multi-USIM UE to be coordinated between two networks. In various scenarios the UE provides all the information required for the coordination and typically without requiring any RAN to RAN communication.

In particular, the following EXAMPLEs have been described:

EXAMPLE 1. A method of operating a wireless communication device (101) capable of connecting to at least one communication network (100, 100-1, 100-2, 115, 115-1, 115-2) using multiple identities (451, 452), the method comprising:
  connecting to the at least one communication network (100, 100-1, 100-2, 115, 115-1, 115-2) using a first identity (451),
  connecting to the at least one communication network (100, 100-1, 100-2, 115, 115-1, 115-2) using a second identity (452), and
  transmitting a request (901, 902, 903) to co-schedule paging occasions (401-403) associated with the first identity (451) and with the second identity (452).

EXAMPLE 2. The method of EXAMPLE 1,
  wherein the request (901, 902) to co-schedule is transmitted when connecting to the at least one communication network (100, 100-1, 100-2, 115, 115-1, 115-2) using the second identity (452), and
  wherein the request (901) to co-schedule comprises an indicator indicative of the first identity (451).

EXAMPLE 3. The method of EXAMPLE 2,
  wherein the indicator comprises the first identity (451).

EXAMPLE 4. The method of EXAMPLE 2,
  wherein the indicator comprises a modulus calculation result of the first identity (451) or a temporary identity associated with the first identity (451), e.g., the S-TMSI.

EXAMPLE 5. The method of any one of the preceding EXAMPLEs,
  wherein the request (902) to co-schedule comprises an indicator indicative of the wireless communication device (101) being capable to connect to the at least one communication network (100, 100-1, 100-2, 115, 115-1, 115-2) using the first identity (451) and the second identity (452).

EXAMPLE 6. The method of EXAMPLE 5,
  wherein the indicator (902) is a flag.

EXAMPLE 7. The method of any one of the preceding EXAMPLEs,
  wherein a timing of the paging occasions (401-403) is determined based on the first identity (451).

EXAMPLE 8. The method of EXAMPLE 7,
  wherein the timing of the paging occasions (401-403) is not determined based on the second identity (452).

EXAMPLE 9. The method of any one of EXAMPLEs 1 to 6,
  wherein the timing of the paging occasions (401-403) is determined neither based on the first identity (451), nor based on the second identity (452).

EXAMPLE 10. The method of any one of the preceding EXAMPLEs, further comprising:
  receiving a paging message (4005),
  checking whether a value of an information element of the paging message (4005) is associated with the first identity (451) or with the second identity (452),
  re-connecting to the at least one communication network (100, 100-1, 100-2, 115, 115-1, 115-2) using the first identity (451) if the value of the information element of the paging message (4005) is associated with the first identity (451), and
  re-connecting to the at least one communication network (100, 100-1, 100-2, 115, 115-1, 115-2) using the second identity (452) if the value of the information element of the paging message (4005) is associated with the second identity (452).

EXAMPLE 11. The method of EXAMPLE 10, further comprising:
receiving a paging indicator (4004) on a given one of the paging occasions (401-403),
wherein the paging message (4005) is selectively received in response to receiving the paging indicator (4004).

EXAMPLE 12. The method of any one of the preceding EXAMPLEs, further comprising:
selectively receiving an acknowledgement associated with the request to co-schedule.

EXAMPLE 13. The method of EXAMPLE 12, further comprising:
if the acknowledgement is not received: monitoring for first paging indicators (4004) on first paging occasions (471-472) associated with the first identity (451) and not associated with the second identity (452), and monitoring for second paging indicators (4004) on second paging occasions (481-482) associated with the second identity (452) and not associated with the first identity (451), and
if the acknowledgement is received: monitoring for paging indicators (4004) on the paging occasions (401-403) associated with the first identity (451) and the second identity (452).

EXAMPLE 14. A method of operating a node (112, 131, 132) of a communication network (100, 100-1, 100-2, 115, 115-1, 115-2), the method comprising:
connecting to a wireless communication device (101) using a second identity (451), the wireless communication device (101) being connected to the communication network (100, 100-1, 100-2, 115, 115-1, 115-2) or a further communication network (100, 100-1, 100-2, 115, 115-1, 115-2) using a first identity (452), and
receiving a request to co-schedule paging occasions (401-403) associated with the first identity (451) and with the second identity (452).

EXAMPLE 15. The method of EXAMPLE 14, further comprising:
in response to receiving the request to co-schedule the paging occasions (401-403): co-scheduling the paging occasions (401-403) associated with the first identity (451) and the second identity (452).

EXAMPLE 16. The method of EXAMPLE 14 or 15, further comprising:
in response to receiving the request to co-schedule the paging occasions (401-403): providing an indicator indicative of the first identity (451) to context information (459) of the wireless communication device (101) associated with the second identity (452).

EXAMPLE 17. The method of any one of EXAMPLEs 14 to 16, further comprising:
setting a value of an information element of a paging message (4005) to be associated with the first identity (451), to thereby trigger re-connecting of the wireless communication device (101) using the first identity (451),
setting the value of the information element of the paging message (4005) to be associated with the second identity (452), to thereby trigger re-connecting of the wireless communication device (101) using the second identity (452).

EXAMPLE 18. The method of EXAMPLE 17, further comprising:
triggering transmission of a paging indicator at a given one of the paging occasions (401-403), and
in association to transmitting the paging indicator: triggering transmission of the paging message (4005).

EXAMPLE 19. A wireless communication device (101) comprising control circuitry (1012) capable of connecting to at least one communication network (100, 100-1, 100-2, 115, 115-1, 115-2) using multiple identities (451, 452), the control circuitry (1012) being configured to:
connect to the at least one communication network (100, 100-1, 100-2, 115, 115-1, 115-2) using a first identity (451),
connect to the at least one communication network (100, 100-1, 100-2, 115, 115-1, 115-2) using a second identity (452), and
transmit a request (901, 902, 903) to co-schedule paging occasions (401-403) associated with the first identity (451) and with the second identity (452).

EXAMPLE 20. The wireless communication device (101) of EXAMPLE 19,
wherein the control circuitry (1012) is configured to execute the method of any one of EXAMPLEs 1 to 13.

EXAMPLE 21. A node (112, 131, 132) of at least one communication network (100, 100-1, 100-2, 115, 115-1, 115-2), the node (112, 131, 132) comprising control circuitry (1122, 1312) configured to:
connect to a wireless communication device (101) using a second identity (451), the wireless communication device (101) being connected to the communication network (100, 100-1, 100-2, 115, 115-1, 115-2) or a further communication network (100, 100-1, 100-2, 115, 115-1, 115-2) using a first identity (452), and
receive a request to co-schedule paging occasions (401-403) associated with the first identity (451) and with the second identity (452).

EXAMPLE 22. The access node (112, 131, 132) of EXAMPLE 21,
wherein the control circuitry (1122, 1312) is configured to execute the method of any one of EXAMPLEs 14 to 18.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

To give an example, various examples have been described in connection with 3GPP 5G cellular networks. Similar examples may be readily applied to 3GPP 4G cellular networks or other types of networks.

For further illustration, various examples have been described according to which the S-TMSI is used as an identity associated with a multi-USIM UE. Various other kinds and types of identities may be used in other examples, e.g., IMSI, SUPI, M-TMSI, etc.

For still further illustration, while various scenarios have been described in connection with a request to co-schedule being included in a RRC control message, other examples may implement the request differently, e.g., using a NAS control message. This also applies to any acknowledgement associate with the request. This applies, in particular, to all scenarios illustrated in FIGS. 13, 14, and 15.

The invention claimed is:

1. A method of operating a wireless communication device capable of connecting to at least one communication network using multiple identities, the method comprising:
   connecting to the at least one communication network using a first identity,
   connecting to the at least one communication network using a second identity, and
   transmitting a request to co-schedule paging occasions associated with the first identity and with the second identity such that the paging occasions associated with the first identity and the second identity are time-aligned with each other,
   wherein the request to co-schedule comprises an indicator indicative of the first identity, and
   wherein the indicator comprises a modulus calculation result of the first identity or a modulus calculation result of a temporary identity associated with the first identity.

2. The method of claim 1,
   wherein the request to co-schedule is transmitted from the wireless communication device to the at least one communication network when the wireless communication device is connecting to the at least one communication network using the second identity.

3. The method of claim 1,
   wherein the modulus calculation comprises a calculation of the first identity or the temporary identity modulus.

4. The method of claim 1,
   wherein the first identity is an international mobile subscriber identity.

5. The method of claim 1,
   wherein the temporary identity is a temporary mobile subscriber identity.

6. The method of claim 1,
   wherein the indicator comprises a UE identity index value.

7. The method of claim 1,
   wherein the request to co-schedule comprises an indicator indicative of the wireless communication device being capable to connect to the at least one communication network using the first identity and the second identity.

8. The method of claim 1,
   wherein a timing of the paging occasions is determined based on the first identity such that the paging occasion associated with the second identity is scheduled to align with a timing of the paging occasion associated with the first identity.

9. The method of claim 1, further comprising:
   receiving a paging message,
   checking whether a value of an information element of the paging message is associated with the first identity or with the second identity,
   re-connecting to the at least one communication network using the first identity if the value of the information element of the paging message is associated with the first identity, and
   re-connecting to the at least one communication network using the second identity if the value of the information element of the paging message is associated with the second identity.

10. The method of claim 1, further comprising:
    selectively receiving an acknowledgement associated with the request to co-schedule.

11. The method of claim 10, further comprising:
    if the acknowledgement is not received: monitoring for first paging indicators on first paging occasions associated with the first identity and not associated with the second identity, and monitoring for second paging indicators on second paging occasions associated with the second identity and not associated with the first identity, and
    if the acknowledgement is received: monitoring for paging indicators on the paging occasions associated with the first identity and the second identity.

12. A wireless communication device comprising control circuitry capable of connecting to at least one communication network using multiple identities, the control circuitry being configured to:
    connect to the at least one communication network using a first identity,
    connect to the at least one communication network using a second identity, and
    transmit a request to co-schedule paging occasions associated with the first identity and with the second identity such that the paging occasions associated with the first identity and the second identity are time-aligned with each other,
    wherein the request to co-schedule comprises an indicator indicative of the first identity, and
    wherein the indicator comprises a modulus calculation result of the first identity or a modulus calculation result of a temporary identity associated with the first identity.

13. A node of at least one communication network, the node comprising control circuitry configured to:
    connect to a wireless communication device using a second identity, the wireless communication device being connected to the communication network or a further communication network using a first identity, and
    receive a request to co-schedule paging occasions associated with the first identity and with the second identity such that the paging occasions associated with the first identity and the second identity are time-aligned with each other,
    wherein the request to co-schedule comprises an indicator indicative of the first identity, and
    wherein the indicator comprises a modulus calculation result of the first identity or a modulus calculation result of a temporary identity associated with the first identity.

14. The wireless communication device of claim 12,
    wherein the request to co-schedule is transmitted from the wireless communication device to the at least one communication network when the wireless communication device is connecting to the at least one communication network using the second identity.

15. The node of claim 13,
    wherein the request to co-schedule comprises an indicator indicative of the wireless communication device being capable to connect to the at least one communication network using the first identity and the second identity.

16. The node of claim 13,
    wherein a timing of the paging occasions is determined based on the first identity such that the paging occasion associated with the second identity is scheduled to align with a timing of the paging occasion associated with the first identity.

17. The node of claim 13,
    wherein the request to co-schedule is transmitted from the wireless communication device to the at least one communication network when the wireless communication device is connecting to the at least one communication network using the second identity.

18. The wireless communication device of claim 12, wherein the request to co-schedule comprises an indicator indicative of the wireless communication device being capable to connect to the at least one communication network using the first identity and the second identity.

19. The wireless communication device of claim 12, wherein a timing of the paging occasions is determined based on the first identity such that the paging occasion associated with the second identity is scheduled to align with a timing of the paging occasion associated with the first identity.

* * * * *